US012354866B2

(12) United States Patent
Inoue et al.

(10) Patent No.: US 12,354,866 B2
(45) Date of Patent: Jul. 8, 2025

(54) MICROWAVE EXCITATION LIGHT-SOURCE DEVICE

(71) Applicant: Mitsubishi Electric Corporation, Tokyo (JP)

(72) Inventors: Akira Inoue, Tokyo (JP); Seiro Yuge, Tokyo (JP); Koji Ota, Tokyo (JP); Akane Nomura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 18/689,703

(22) PCT Filed: Sep. 17, 2021

(86) PCT No.: PCT/JP2021/034380

§ 371 (c)(1),
(2) Date: Mar. 6, 2024

(87) PCT Pub. No.: WO2023/042388

PCT Pub. Date: Mar. 23, 2023

(65) Prior Publication Data

US 2025/0132143 A1 Apr. 24, 2025

(51) Int. Cl.

| | |
|---|---|
| ***H01J 61/32*** | (2006.01) |
| ***H01J 61/06*** | (2006.01) |
| ***H01J 61/42*** | (2006.01) |
| ***H01J 65/04*** | (2006.01) |

(52) U.S. Cl.

CPC .............. *H01J 61/32* (2013.01); *H01J 61/06* (2013.01); *H01J 61/42* (2013.01); *H01J 65/042* (2013.01)

(58) Field of Classification Search

CPC .................. H01J 65/042; H01J 65/044; H01J 61/54-547; H01J 61/42-44; H01J 61/32

See application file for complete search history.

(56) References Cited

FOREIGN PATENT DOCUMENTS

| | | | | | |
|---|---|---|---|---|---|
| JP | 2000-348684 | A | | 12/2000 | |
| JP | 2007-220410 | A | | 8/2007 | |
| JP | 2008-171658 | A | | 7/2008 | |
| JP | 2016225037 | A | * | 12/2016 | |
| WO | WO-2014141182 | A1 | * | 9/2014 | C02F 1/325 |
| WO | WO-2023079725 | A1 | * | 5/2023 | H01J 65/044 |

OTHER PUBLICATIONS

International Search Report issued in PCT/JP2021/034380; mailed Dec. 14, 2021.

* cited by examiner

*Primary Examiner* — Mariceli Santiago
(74) *Attorney, Agent, or Firm* — Studebaker Brackett PLLC

(57) ABSTRACT

A microwave excitation light-source device includes: a center conductor extending in an axis direction; an annular conductor having light transparency and disposed concentrically with respect to the center conductor; and an arc tube in which a luminescent material is enclosed, the arc tube being disposed so as to extend along the axis direction in an annular space created between the center conductor and the annular conductor; wherein, with respect to the arc tube, in a plane that is perpendicular to the axis direction, a single closed curve drawn along a tube wall of the arc tube intersects zero or even number of times, every line drawn from the center conductor toward the annular conductor.

19 Claims, 9 Drawing Sheets

MICROWAVE EXCITATION LIGHT-SOURCE DEVICE

TECHNICAL FIELD

The present application relates to a microwave excitation light-source device.

BACKGROUND ART

A microwave excitation light-source device has been developed which radiates light of a desired frequency in such a manner that, in order to eliminate light-emission failure due to electrode deterioration, microwaves are fed to a light emitting cell (arc tube) in which a luminescent material is enclosed, from an electrode located outside the arc tube. For efficiently utilizing at that time the microwaves induced by the electrode, there is proposed a light-source device in which the arc tube is configured to have a concentrically double structure so that the generation space of microwaves and the internal space are matched in shape to each other (see, for example, Patent Document 1).

CITATION LIST

Patent Document

Patent Document 1: Japanese Patent Application Laid-open No. 2007-220410 (Paragraphs 0022 to 0042; FIG. 1 to FIG. 3)

SUMMARY OF THE INVENTION

Problems to be Solved by the Invention

However, since the luminescent material is gas, for manufacturing the arc tube having such a double structure, there is required a complicated process of hermetically sealing the inner tube with the outer tube in a gas-enclosed state, and this hinders achievement of cost reduction.

This application discloses a technique for solving the problem as described above, and an object thereof is to provide a microwave excitation light-source device that efficiently radiate desire light at a low cost.

Means for Solving the Problems

A microwave excitation light-source device disclosed in this application is characterized by comprising: a center conductor extending in an axis direction; an annular conductor having light transparency and disposed concentrically with respect to the center conductor; an arc tube in which a luminescent material is enclosed, said arc tube being disposed so as to extend along the axis direction in an annular space created between the center conductor and the annular conductor; and a support unit that supports the center conductor, the annular conductor and the arc tube and in which electrical connection paths for applying microwaves to the center conductor and the annular conductor are formed; wherein the arc tube is configured so that, in a plane that is perpendicular to the axis direction, a single closed curve drawn along a tube wall of the arc tube intersects zero or even number of times, every line drawn from the center conductor toward the annular conductor.

Effect of the Invention

According to the microwave excitation light-source device disclosed in this application, since uniform radiation along the axis direction can be achieved using a single tube that is easily manufacturable, it is possible to radiate desired light at a low cost.

MODES FOR CARRYING OUT THE INVENTION

Embodiment 1

Figure 1A:
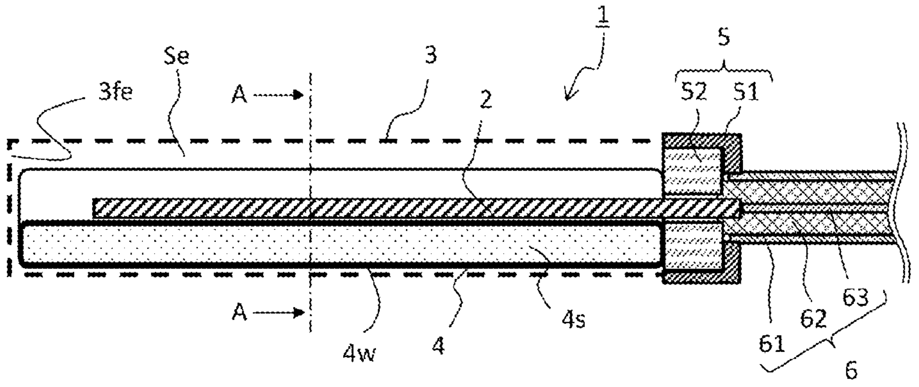
FIG. 1A and FIG. 1B are sectional views of a microwave excitation light-source device, along its axis and perpendicular to that axis, respectively, according to Embodiment 1.
Figure 1B:
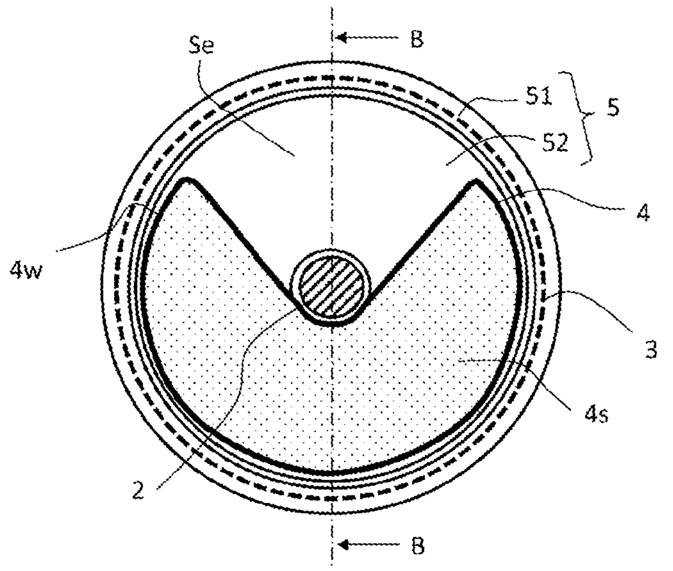

FIG. 1A and FIG. 1B serve for explaining a configuration of a microwave excitation light-source device according to Embodiment 1, in which FIG. 1A is a sectional view of the microwave excitation light-source device along its axis and FIG. 1B is a sectional view thereof perpendicular to that axis. Further, the cross-section of FIG. 1A is taken along a line B-B in FIG. 1B, and the cross-section of FIG. 1B is taken along a line A-A in FIG. 1A.

As shown in FIG. 1A, a microwave excitation light-source device 1 according to each of Embodiments of this application includes a conductor 2 disposed at a radial center thereof, an annular conductor 3 disposed concentrically with respect to the center conductor 2, and an arc tube 4 disposed in an annular space between the center conductor 2 and the annular conductor 3. The arc tube 4, even though its structure will be detailed later, is being formed into a tubular form by using, for example, quarts glass having an ultraviolet transmittance that is higher than that of another glass, and in the inside thereof (light emitting space 4*s*), mercury (Hg) or the like as a luminescent material is enclosed. Further, the center conductor 2, the annular conductor 3 and the arc tube 4 are mechanically supported by a support unit 5.

The center conductor 2 is electrically connected to one of the electrodes of an unshown microwave generation source through an inner conductor 63 of a coaxial line 6. Meanwhile, the annular conductor 3 has, for example, such a configuration called as a mesh conductor that establishes a mesh form through which light can be passed at least partly, and is electrically connected to the other electrode of the microwave generation source, through an outer conductor 61 of the coaxial line 6 and a conductor 51 located in the support unit 5 on its outer circumferential side. Here, by means of an annular insulator 52 located in the support unit 5 on its inner circumferential side and an insulator 62 in the coaxial line 6, the center conductor 2 and the annular conductor 3 are insulated from each other on at least their side near the support unit 5 in an axis direction thereof.

When microwaves are fed into the thus-configured microwave excitation light-source device 1 from the microwave generation source, a microwave electromagnetic field is created in the annular space between the center conductor 2 and the annular conductor 3. Due to the thus-created microwave electromagnetic field, the luminescent material in the light emitting space 4*s* of the arc tube 4 disposed in the annular space is excited to emit light, so that the light can be radiated after being passed through the annular conductor 3.

Note that, the so-far mentioned configuration is similar to that of a usual microwave excitation light-source device described in "BACKGROUND ART". In contrast to that configuration, according to the microwave excitation light-source device 1 of this application, the arc tube 4 is configured to extend in the axis direction so as to create, in a plane perpendicular to the axis, an interspace Se that is continuous between the center conductor 2 and the annular conductor 3 as shown in FIG. 1B, and thus, in Embodiment 1, the arc tube is formed into a sector form in that plane. Namely, in a plane perpendicular to the axis, the region of the light emitting space 4*s* is established in a state in which a circumferential part of the annular space created between the center conductor 2 and the annular conductor 3 remains open.

In other words, the arc tube 4 is configured so that, in a plane that is perpendicular to the axis, a single closed curve (simple closed curve) drawn along a tube wall 4*w* of the arc tube 4 intersects zero or two times, every line drawn from the center conductor 2 toward the annular conductor 3. Note that, although "intersection of two times" is stated above, when, for example, a concavity/convexity is provided in a radially extending portion of the tube wall 4*w*, or a curve is drawn from the center conductor 2 toward the annular conductor 3, intersection of even number of times more than two times may occur. On the contrary, according to a double tube, its two tube walls along which respective single closed curves are drawn, each intersect once or odd number of times, every line drawn from the center conductor 2 toward the annular conductor 3.

Namely, the arc tube 4 is formed, not as the double tube shown in Patent Document 1 but as a single tube, and is configured to extend in the axis direction with the light emitting space 4*s* whose area (shape) perpendicular to the axis direction is kept constant. Accordingly, it is possible to provide the microwave excitation light-source device 1 without undergoing a complicated process at the time the double tube is to be formed.

Meanwhile, in Patent Document 1, it is stated that, by using the annular space entirely as a light emitting region, desired light can be radiated efficiently. However, as a result of our investigation in terms of utilization of radiated light (irradiation of an object to be treated), it is found that, with respect to the light emitting space 4*s*, in a plane perpendicular to the axis, it is not necessary to emit light at the entire interspace between the center conductor 2 and the annular conductor. For example, in the case of irradiation with ultraviolet light for sterilization, it is found that such a configuration that radiates the light uniformly in the axis direction is the most efficient light-emission configuration. Namely, it is found that, even if the luminescent efficiency is high, such a configuration in which light is emitted, for example, partly in the axis direction, is not necessarily efficient in terms of utilization of radiated light.

For that reason, according to the microwave excitation light-source device 1 of this application, the arc tube 4 is formed as a single tube with the light emitting space 4*s* that extends in the axis direction and has, in a plane perpendicular to the axis, a sector form so that a circumferential part of the annular space created between the center conductor 2 and the annular conductor 3 remains open.

Accordingly, by generating microwaves of 2.45 GHz in the annular space by use of mercury (Hg) as a luminescent material, for example, it is possible to provide the microwave excitation light-source device 1 with a high sterilizing effect that corresponds to the utilization efficiency of the radiated light. In that case, if the microwave excitation light-source device is configured so that the microwaves are provided as traveling waves in the annular space, more uniform radiation (irradiation of the object to be treated) in the axis direction can be achieved.

First Modified Example

Figure 2A:
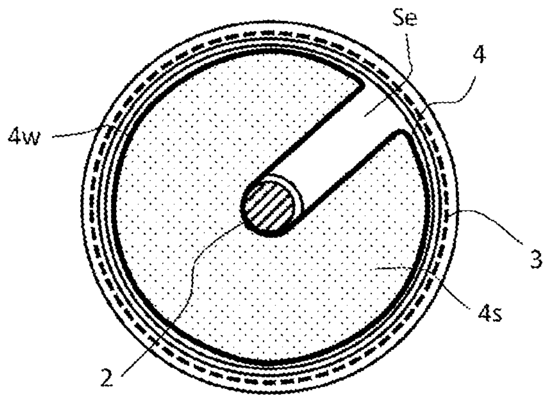
FIG. 2A to FIG. 2C are each a sectional view of each of microwave excitation light-source devices having arc tubes with different shapes, perpendicular to its axis, according to First Modified Example of Embodiment 1.
Figure 2B:
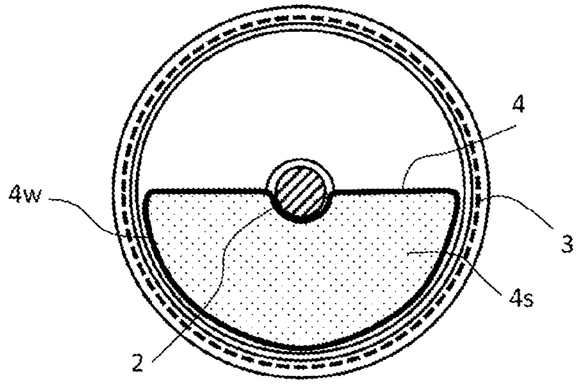
Figure 2C:
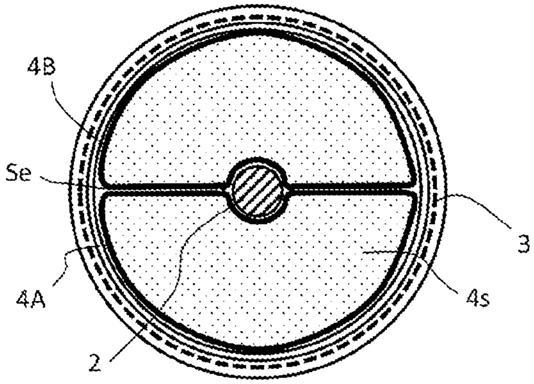

It is noted that, in the above case, a configuration has been described that uses one arc tube having a light emitting space whose cross-sectional shape perpendicular to the axis is such a sector form; however, this configuration is not limitative. In First Modified Example, description will be made on cases where cross-sectional shapes of arc tubes are different from each other or numbers of disposed arc tubes are different from each other. FIG. 2A to FIG. 2C serve for explaining configurations of microwave excitation light-source devices having their respective arc tubes that are different in cross-sectional shape perpendicular to the axis or different in tube disposed number, said figures each a cross-sectional shape perpendicular to the axis corresponding to FIG. 1B. In the figures, to the portions that are equivalent to those described in Embodiment 1, the same reference numerals are given, so that duplicated description will be omitted. Note that, in any one of these modified examples, the arc tube is configured to extend along the axis direction with the illustrated cross-sectional shape, as has been described using FIG. 1A in Embodiment 1.

When the cross-sectional shape of the arc tube 4 perpendicular to its axis is provided as a circular shape concaved partially in the circumferential direction as shown in FIG. 2A, it is possible to increase the space utilization rate of the annular space without complicating the process. Instead, it may be provided as a semicircular shape whose portion facing to the center conductor 2 is recessed as shown in FIG. 2B. If this is the case, in a plane perpendicular to the axis, the region of the light emitting space 4*s* becomes half the annular space; however, even so, the energy of the microwaves in the annular space will be consumed concentrically in the light emitting space 4*s*, so that light can be emitted efficiently.

Instead, as shown in FIG. 2C, two arc tubes (arc tube 4A, arc tube 4B) each being the arc tube 4 described in FIG. 2B may be used in combination. If this is the case, it is required to manufacture two arc tubes 4; however, it is possible to maximize the space utilization rate without the complexity as in the case of manufacturing one double tube.

Second Modified Example

Figure 3:
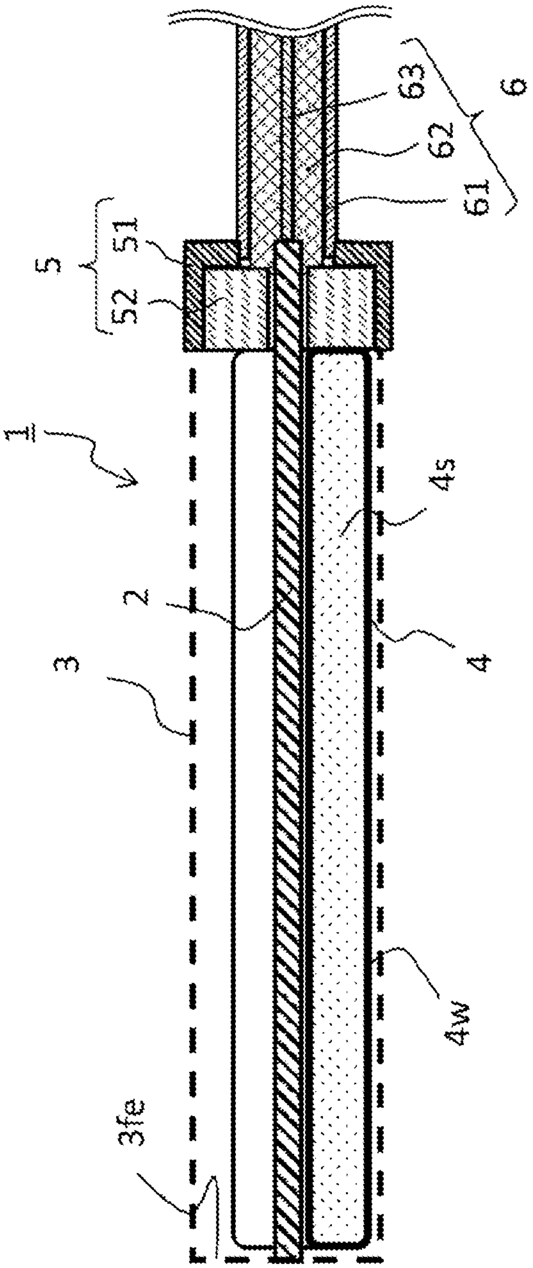
FIG. 3 is a sectional view of a microwave excitation light-source device having a center conductor with a different configuration, along its axis, according to Second Modified Example of Embodiment 1.

It is noted that, in the foregoing cases, examples are shown in which the leading end side of the center conductor is left free; however, this configuration is not limitative. In Second Example, Modified description will be made on a case where the center conductor is short-circuited at its leading end to the end surface portion of the annular conductor. FIG. 3 serves for explaining a configuration of a microwave excitation light-source device having a center conductor with a different configuration according to Second Modified Example, and is a sectional view perpendicular to the axis corresponding to FIG. 1B. Note that although the arc tube is illustrated as having a configuration equivalent to that in FIG. 1B, it may have a configuration according to First Modified Example, or any one of configurations to be described later in Embodiment 2 and the following Embodiments.

Even when the center conductor 2 is short-circuited to an end surface 3*fe* of the annular conductor 3 as shown in FIG. 3, it is possible, like in the description using FIG. 1A, to provide a microwave excitation light-source device 1 which can effectively utilize the radiated light, without complicating the manufacturing process thereof.

Embodiment 2

Figure 4A:
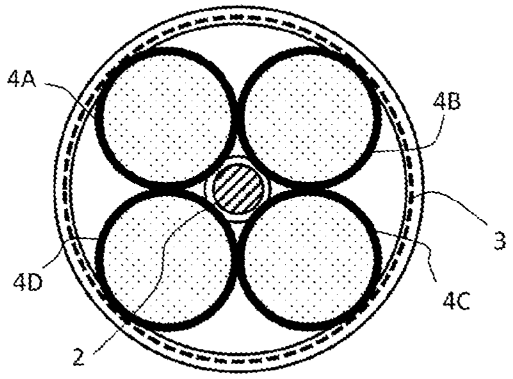
FIG. 4A and a set of FIG. 4B and FIG. 4C are sectional views of microwave excitation light-source devices having different numbers of disposed arc tubes, perpendicular to their axes, according to Embodiment 2 and according to its Modified Example, respectively.
Figure 4B:
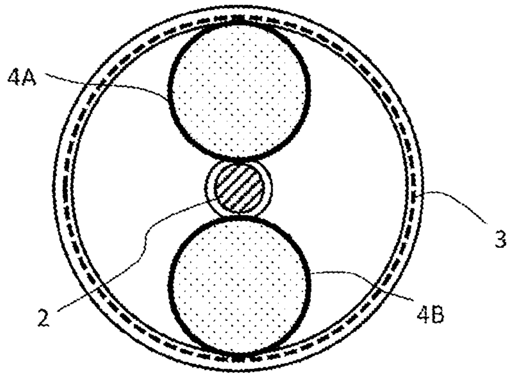
Figure 4C:
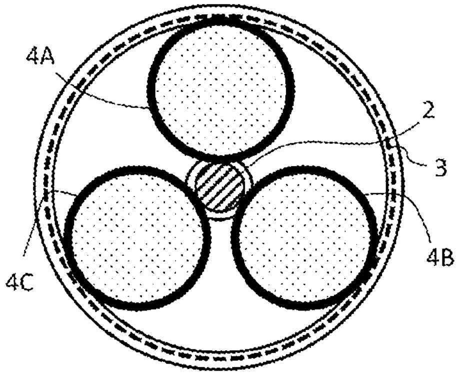

In Embodiment 1 and its Modified Examples, the description has been made on cases where the arc tube whose cross-sectional shape is not a circle is used. In Embodiment 2, description will be made on cases where multiple so-called straight tubes whose cross-sectional shapes are each a circle are used and disposed so as to sandwich or surround the center conductor. FIG. 4A to FIG. 4C serve for explaining microwave excitation light-source devices according to Embodiment 2 and its Modified Example in which numbers of disposed arc tubes are different from each other, said figures each being a sectional view perpendicular to the axis corresponding to FIG. 1B.

As a microwave excitation light-source device 1 according Embodiment 2, an example is shown in which, as shown in FIG. 4A, four arc tubes 4 (arc tube 4A to arc tube 4C) that are composed of so-called straight tubes whose cross-sections perpendicular to their axes are circles, are disposed clockwise around the center conductor 2. In this case, the number of arc tubes 4 to be manufactured becomes larger than that in Embodiment 1. However, the process of manufacturing the arc tube 4 is further simplified and, since light is radiated uniformly along the axis direction, it is possible to provide a microwave excitation light-source device 1 utilization efficiency of light is improved.

Modified Example

Likewise, in the case where, as shown in FIG. 4B as a modified example, two arc tubes 4 (arc tube 4A and arc tube 4B) are disposed so as to sandwich the center conductor 2, since light is radiated uniformly along the axis direction, it is also possible to provide a microwave excitation light-source device 1 whose utilization efficiency of light is improved. Instead, in the case where, as shown in FIG. 4C, three arc tubes 4 (arc tube 4A to arc tube 4C) are disposed clockwise so as to surround the center conductor 2, since light is radiated uniformly along the axis direction likewise, it is also possible to provide a microwave excitation light-source device 1 whose utilization efficiency of light is improved.

It is noted that, in FIG. 4A to FIG. 4C, cases are shown where the center conductor 2 is sandwiched or surrounded by multiple arc tubes 4 composed of straight tubes, so that their light emitting spaces 4*s* are disposed in a uniformly dispersed manner in the circumferential direction; however, this configuration is not limitative. As will be described later in Embodiments 5 and 6, a case is allowed where the distribution of the light emitting spaces 4*s* is non-uniform in the circumferential direction, for example, with reference to FIG. 4A, only the arc tube 4C and the arc tube 4D may be disposed instead. Likewise, with reference to FIG. 4B, only the arc tube 4B may be disposed instead and, with reference to FIG. 4C, only the arc tubes 4B and 4C may be disposed instead.

Embodiment 3

Figure 5A:
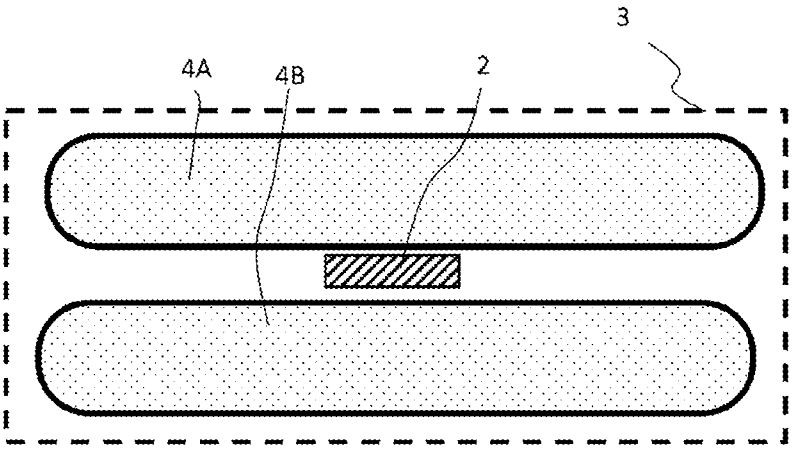
FIG. 5A and FIG. 5B are end views of microwave excitation light-source devices having different numbers of disposed arc tubes, perpendicular to their axes, according to Embodiment 3 and according to its Modified Example, respectively.
Figure 5B:
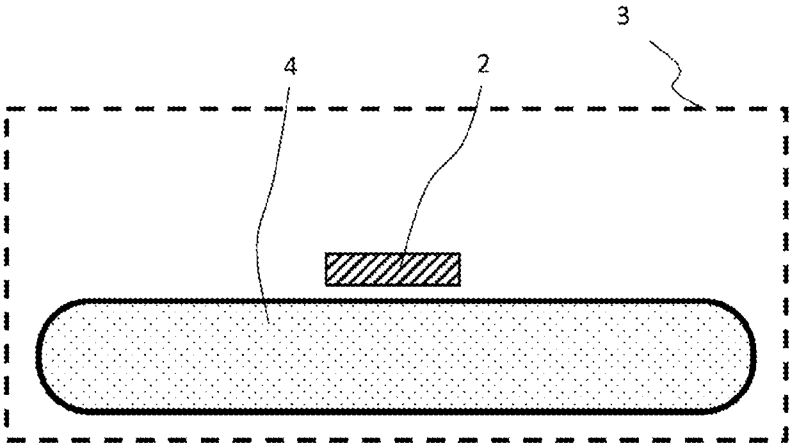

In the above Embodiments 1, 2, the description has been made on cases where the annular space that is circular is created. In Embodiment 3, description will be made on cases where cross-sections of the annular conductor and the center conductor across their axes are each formed into a rectangular shape. In FIG. 5A and FIG. 5B serve for explaining microwave excitation light-source devices according to Embodiment 3 and its Modified Example in which numbers of disposed arc tubes are different from each other, said figures each being an end view perpendicular to the axis according to a cross-section similar to FIG. 1B. Note that, also in Embodiment 3, the arc tube is configured to extend along the axis direction with the illustrated cross-sectional shape, as has been described using FIG. 1A in Embodiment 1.

In a microwave excitation light-source device 1 according to Embodiment 3, as shown in FIG. 5A, a center conductor 2 whose cross-sectional shape is a flat rectangular shape is disposed in a gravity center region (corresponding to the concentric center in Embodiment 1) of an annular conductor 3 whose cross-sectional shape perpendicular to its axis is a flat rectangular shape, to thereby form a line structure. Further, the cross-section perpendicular to the axis is bisected as viewed from the side of its short-side portion, and in the respective bisected regions, the arc tube 4A and the arc tube 4B each being a single tube and each having a flat cross-section, are disposed.

In this case, the process of manufacturing the arc tube 4 is simplified as compared with the case where a double tube is used and, since light is radiated uniformly along the axis direction, it is also possible to provide a microwave excitation light-source device 1 whose utilization efficiency of light is improved.

An effect similar to the above can also be achieved when, as in a modified example shown in FIG. 5B, the cross-section perpendicular to the axis is bisected as viewed from the side of its short-side portion, and in one of the bisected regions, the arc tube 4 being a single tube and having a flat cross-section, is disposed.

Embodiment 4

Figure 6:
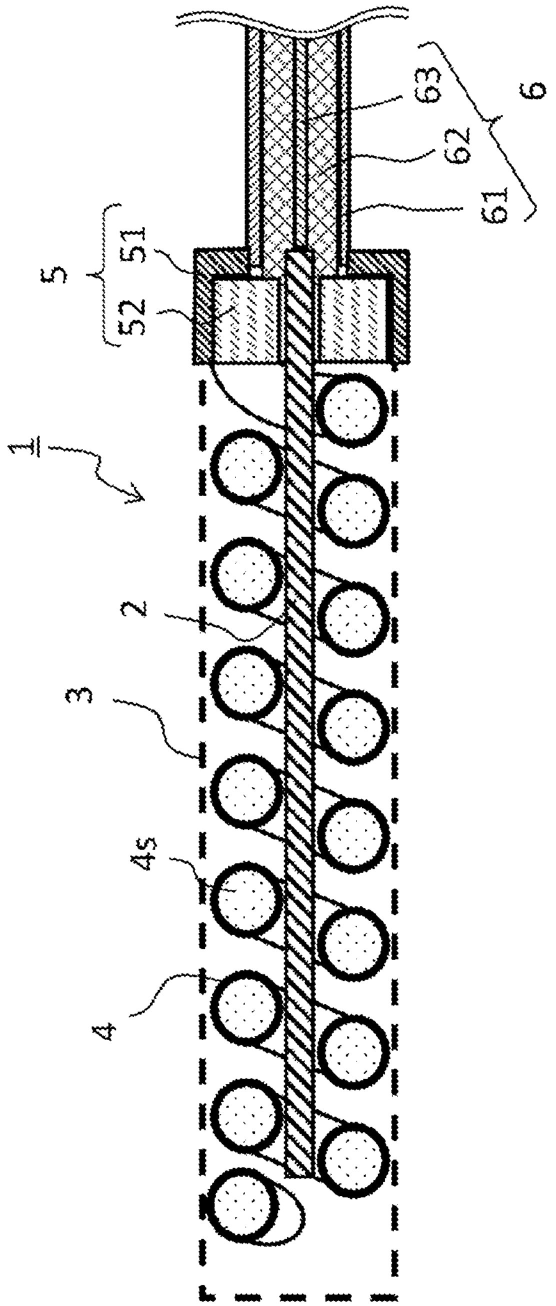
FIG. 6 is a sectional view of a microwave excitation light-source device, along its axis, according to Embodiment 4.

In the above Embodiments 1 to 3, the description has been made on cases where such an arc tube is used that has a structure in which a cross-sectional shape perpendicular to its axis continues linearly along that axis. In Embodiment 4, description will be made on a case where an arc tube is used that extends along an axis while whirling around the center conductor, to form a spiral shape. FIG. 6 serves for explaining a microwave excitation light-source device according to Embodiment 4, and is a sectional view along the axis corresponding to FIG. 1A.

In a microwave excitation light-source device 1 according to Embodiment 4, as shown in FIG. 6, a straight tube is deformed to be distorted helically (spirally) so that it extends along an axis while whirling n the annular space between the center conductor 2 and the annular conductor 3. Even in this case, it is possible to manufacture the arc tube 4 in a manner that is easier than in the case of manufacturing a double tube, and to radiate light uniformly not only in the axis direction but also in the circumferential direction.

Embodiment 5

Figure 7A:
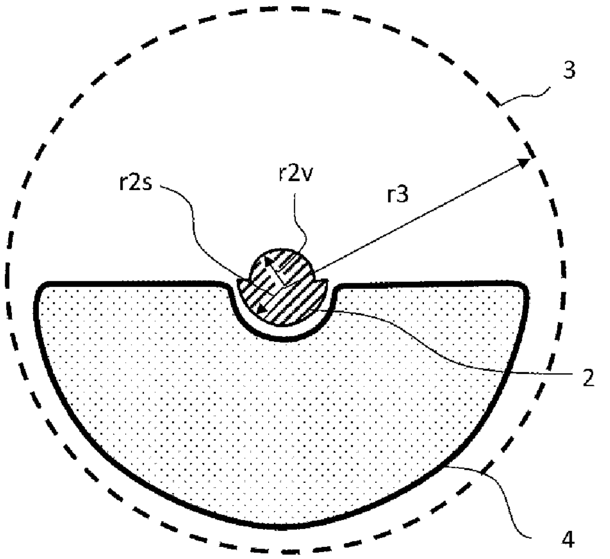
FIG. 7A and FIG. 7B are end views of microwave excitation light-source devices, perpendicular to their axes, according to Embodiment 5 and according to its Modified Example, respectively.
Figure 7B:
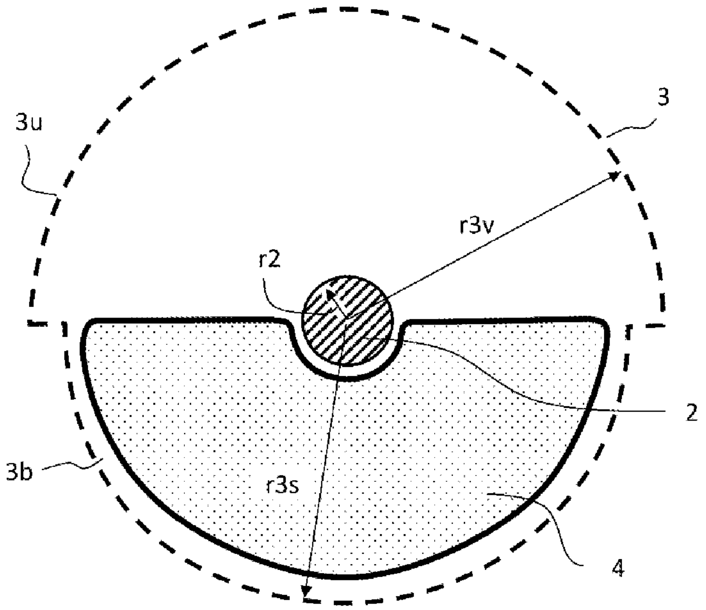

In Embodiment 5, description will be made on a case where a light emitting space is located non-uniformly in the circumferential direction as mentioned in the last half of Embodiment 2. FIG. 7A and FIG. 7B serve for explaining microwave excitation light-source devices according to Embodiment 5 and its Modified Example in which the shapes of center conductors, as well as those of annular conductors, are different from each other, said figures each being an end view corresponding to FIG. 1B at the time the device is cut in a sectional plane perpendicular to its axis.

When the shapes of the cross-sections of the center conductor 2 and the annular conductor 3 perpendicular to their axes, are circles with a radius r2 and a radius r3, respectively, the characteristic impedance z of their coaxial line can be represented by a formula (1). Note that "Er" denotes a dielectric constant of a material in the space.

[Mathematical 1]

$$z = \frac{60}{\sqrt{Er}} \ln\left(\frac{r3}{r2}\right) \tag{1}$$

It is noted that the formula (1) is based on the assumption that the conditions of the annular space are uniform in the circumferential direction and thus, if the light emitting space 4*s* is one-sided to a semicircular region as in FIG. 2B described as a modified example of Embodiment 1, non-uniformity of impedance will occur in the circumferential direction. Accordingly, in Embodiment 5, as shown in FIG. 7A, with respect to the center conductor 2, a radius r2*v* of its part corresponding to an upper region in the figure where the arc tube 4 is not disposed, is set smaller than a radius r2*s* of its part corresponding to a lower region in the figure where the arc tube 4 is disposed to be one-sided.

This makes it possible to cancel out an increase in dielectric constant due to a lack of the arc tube 4 disposed, to thereby keep the impedance at a specified value (for example, 50Ω). Thus, it is possible to establish microwave excitation highly efficiently without causing unwanted reflection.

Modified Example

Instead, as represented by a modified example shown in FIG. 7B, when, with respect to the annular conductor 3, a radius r3*v* of its part corresponding to an upper region in the figure where the arc tube 4 is not disposed, is set larger than a radius r3*s* of its part corresponding to a lower region in the figure where the arc tube 4 is disposed to be one-sided, it is also possible to achieve an effect similar to the above. Note that the radii of both the annular conductor 3 and the center conductor 2 may be so varied in the circumferential direction.

Embodiment 6

Figure 8A:
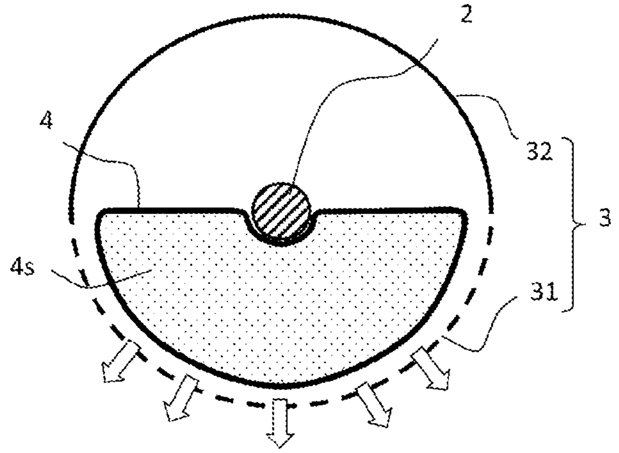
FIG. 8A and FIG. 8B are end views of microwave excitation light-source devices, perpendicular to their axes, according to Embodiment 6 and according to its Modified Example, respectively.
Figure 8B:
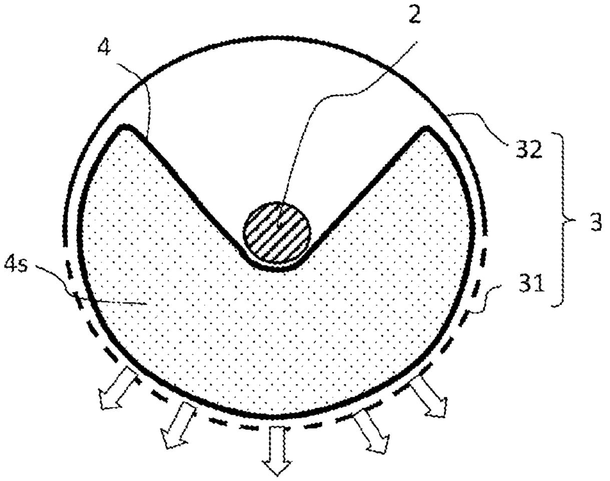

In the above Embodiments 1 to 5, the description has been made on cases where, in order that the light can be radiated in all directions across the circumferential direction, the a conductor is configured as a mesh conductor through which the radiated light passes all around. In Embodiment 6, description will be made on a case where a reflective member is used as a part of the annular conductor so that the light is radiated from a region that is one-sided in the circumferential direction. FIG. 8A and FIG. 8B serve for explaining microwave excitation light-source devices according to Embodiment 6 and its Modified Example in which shapes of their respective arc tubes are different from each other, said figures each being an end view corresponding to FIG. 1B at the time the device is cut in a sectional plane perpendicular to its axis.

In a microwave excitation light-source device 1 according to Embodiment 6, as shown in FIG. 8A, a semicircular arc tube 4 is disposed so as to be one-sided to the lower side of the center conductor 2 in the figure and, in a manner corresponding thereto, the upper side of an annular conductor 3 is composed of a reflective film (reflective member 32) while the lower side thereof is composed of a mesh conductor (light transmissive member 31). Namely, with reference to the annular conductor 3 described in each of Embodiments 1 to 5 which is circumferentially entirely formed as a light-transmissive mesh conductor, its side corresponding to a region in the circumferential direction where the arc tube 4 is not disposed, is substituted with the reflective member 32.

This makes it possible to radiate the light in a concentrated manner from one side in the circumferential direction. In particular, since the reflective member 32 is located on a side where the arc tube 4 is not disposed (light emitting space 4*s* is lacked), the direct light from the arc tube 4 can be radiated efficiently without being shaded by the center conductor 2.

Modified Example

It is noted that, even when a sector formed arc tube 4 is used as shown in a modified example of FIG. 8B, the annular conductor 3 may be configured so that its portion on an upper side where the arc tube 4 is not disposed is composed of a reflective member 32 while its portion on the lower side is composed of a light transmissive member 31. If this is the case, it is not necessarily required that, in the circumferential direction, the located position of the reflective member 32 or the light transmissive member 31 be fully matched with the position where the arc tube 4 is placed. Thus, correspondingly to the range of radiation (radiation angle in the circumferential direction), the lower half of the annular conductor is composed of the light transmissive member 31, here.

Embodiment 7

Figure 9:
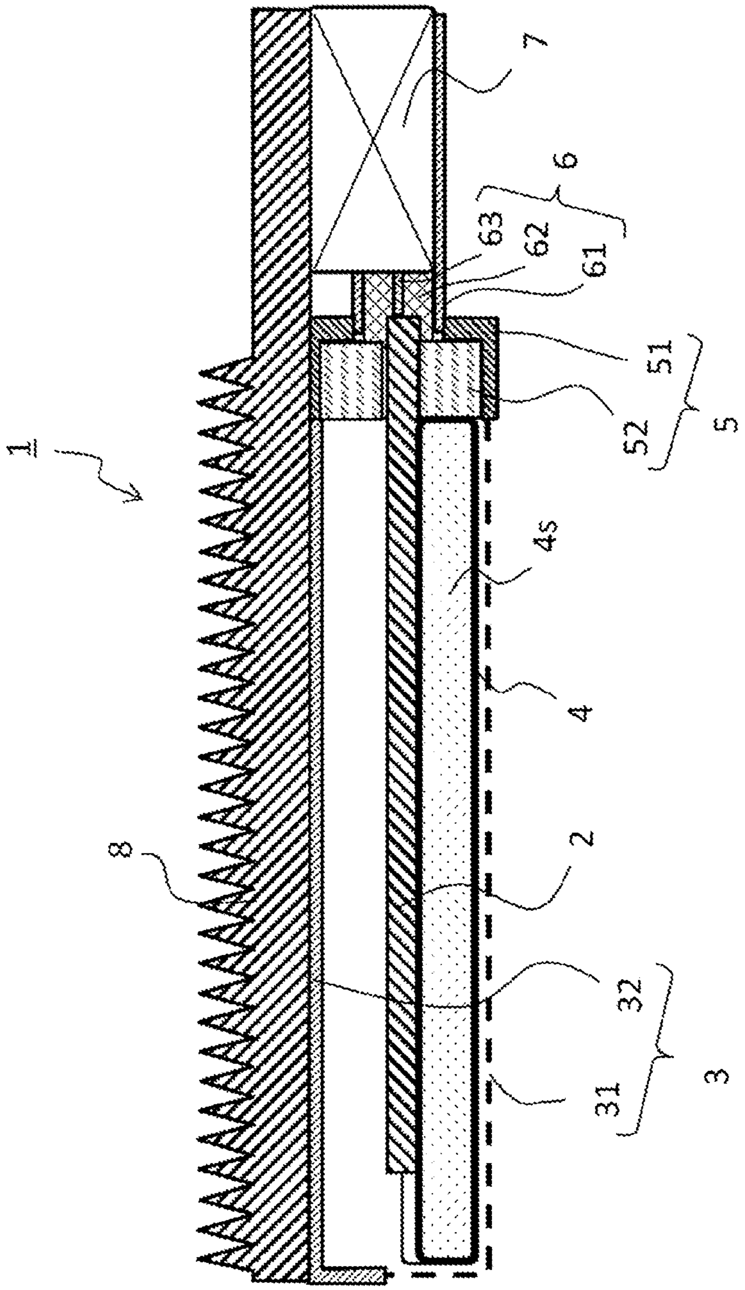
FIG. 9 is a sectional view of a microwave excitation light-source device, along its axis, according to Embodiment 7.

In the above Embodiment 6, the description has been made on cases where the annular conductor is configured by using a reflective member and a light transmissive member separately in the circumferential direction, so that the range of radiation in the circumferential direction is restricted. In Embodiment 7, description will be made on a case where, in addition to the configuration of Embodiment 6, a semiconductor amplifier is used as a microwave generation source, and a heat dissipation unit that dissipates heat from the semiconductor amplifier is provided on a portion where the reflective member is located. FIG. 9 serves for explaining a microwave excitation light-source device according to Embodiment 7, and is a sectional view along its axis corresponding to FIG. 1A.

As shown in FIG. 9, a microwave excitation light-source device 1 according to Embodiment 7 uses a semiconductor amplifier 7 of, for example, gallium nitride (GaN) or the like, as a microwave generation source. Further, in order to set the range of radiation to be directed downward in the figure, a semicircular arc tube 4 is disposed so as to be one-sided to the lower side of the center conductor 2 in the figure and, in a manner corresponding thereto, the upper side of an annular conductor 3 is composed of a reflective member 32 while the lower side thereof is composed of a light transmissive member 31. In addition, a heat dissipation unit 8 for dissipating heat generated in the semi-conductor amplifier 7 through natural air-cooling provided on the radially outer side of the reflective member 32.

While the semiconductor amplifier 7 is characterized by having high output power and high durability and being high in long-term reliability, it generates a large amount of heat, so that, in its use, it is important to take a measure to dissipate the heat. However, since a heat dissipation member occupies space, it hinders compactification in many cases. In contrast, when, as in Embodiment 7, a heat dissipation fin (heat dissipation unit 8) is provided on the radially outer side of the reflective member 32 partly formed in the annular conductor 3 in order to restrict the range of radiation, namely, on the back side as viewed from the emitted-light radiation side, the device is prevented from being enlarged. Thus, it is possible to provide a microwave excitation light-source device 1 that is high in utilization efficiency of light as well as high in reliability, at a low cost.

It is noted that, in FIG. 9, the reflective member 32 and the heat dissipation unit 8 are illustrated as tightly attached separate objects; however, this is not limitative, and they may be formed as a single integrated object, namely, a reflective plate having a heat dissipation fin may be used for the reflective member 32 as a part of the annular conductor 3.

It should be noted that, in this application, a variety of exemplary embodiments and examples have been described; however, every characteristic, configuration or function that has been described in one or more embodiments is not limited to being applied to a disclosed content in a specific embodiment, and may be applied singularly or in any of various combinations thereof to any other embodiment. Accordingly, an infinite number of modified examples that are not exemplified here are supposed within the technical scope disclosed in the description of this application. For example, such cases shall be included where at least one configuration element is modified; where at least one configuration element is added or omitted; and furthermore, where at least one configuration element is extracted and combined with a configuration element disclosed in another embodiment.

For example, although cases have been described where the annular conductor 3 (or, light transmissive member 31) is configured as a mesh conductor, this is not limitative, and an ITO (Indium-Tin Oxide) electrode that is referred to also as a transparent electrode may instead be used. Further, cases have been described where mercury is used as the luminescent material on the premise of achieving sterilization; however, this is not limitative. Thus, if the usage is that in which uniform radiation (irradiation of the object to be treated) in the axis direction is desired, surfer(S), argon (Ar), xenon (Xe) or the like may be used as the luminescent material, and correspondingly thereto, the frequency of the microwaves may be determined appropriately. Moreover, although it has been assumed that the material of the arc tube 4 is quarts glass having a high ultraviolet transmittance, the material may, of course, be chosen appropriately so that it matches the light to be radiated.

As described above, the microwave excitation light-source device 1 of this application comprises: the center conductor 2 extending in an axis direction; the annular conductor 3 having light transparency and disposed concentrically with respect to the center conductor 2; the arc tube 4 in which a luminescent material is enclosed, said arc tube being disposed so as to extend along the axis direction in an annular space created between the center conductor 2 and the annular conductor 3; and the support unit 5 that supports the center conductor 2, the annular conductor 3 and the arc tube 4 and in which electrical connection paths for applying microwaves to the center conductor 2 and the annular conductor 3 are formed; wherein the arc tube 4 is configured so that, in a plane that is perpendicular to the axis direction, a single closed curve drawn along the tube wall 4*w* of the arc tube intersects zero or even number of times, every line drawn from the center conductor 2 toward the annular conductor 3. Accordingly, uniform radiation along the axis direction can be achieved using the arc tube 4 as a single tube that is easily manufacturable and thus, it is possible to radiate desired light with a high utilization efficiency and at a low cost.

On this occasion, if the shape of the arc tube 4 in cross-section perpendicular to the axis direction is a sector form that catches the center conductor 2 at a center angle portion of that shape, it is possible to improve the utilization of the annular space by simply mounting one arc tube 4. Furthermore, since the arc tube can be overlaid on the center conductor 2 from one side in the radial direction, assembling can be achieved easily.

In another aspect, if the arc tubes 4 are used which are composed of multiple straight tubes that extend in the axis direction and are arranged in the circumferential direction, even though the number of tubes increases, the configuration can be achieved using straight tubes that are simple and easiest to be manufactured. Furthermore, this makes it possible to easily set the distribution of the light emitting spaces 4*s* along the circumferential direction.

In further another aspect, when the center conductor 2 and the annular conductor 3 each have a rectangular shape as a shape perpendicular to the axis direction, to form a line structure, uniform radiation along the axis direction can also be achieved using the arc tube 4 as a single tube that is easily manufacturable and thus, it is possible to radiate desired light with a high utilization efficiency and at a low cost.

Further, when the arc tube 4 is disposed in a region that is circumferentially one-sided with respect to the center conductor 2, and if one of the following conditions is satisfied:

with respect to the center conductor 2, its part corresponding to a region where the arc tube 4 is not disposed, is smaller in radius (radius r2*v*) than its part corresponding to the region where the arc tube 4 is disposed; and with respect to the annular conductor 3, its part corresponding to the region where the arc tube 4 is not disposed, is larger in radius (radius r3_v_) than its part corresponding to the region where the arc tube 4 is disposed;

it is possible to establish microwave excitation highly efficiently without causing unwanted reflection, while keeping the impedance at a necessary value (for example, 50 2).

Even if the arc tube 4 is differently configured to form a spiral shape that extends along the axis direction while whirling in the annular space, uniform radiation along the axis direction can be achieved using the arc tube 4 as a single tube that is easily manufacturable and thus, it is possible to radiate desired light with a high utilization efficiency and at a low cost.

If the arc tube 4 is disposed in a region that is circumferentially one-sided with respect to the center conductor 2, and a part of the annular conductor 3 corresponding to a region where the arc tube 4 is not disposed, is composed of the reflective member 32 that reflects light, it is possible to radiate light efficiently in desired directions across the circumferential direction.

On this occasion, if the semiconductor amplifier 7 is further provided as a generation source of the microwaves and if, with respect to the reflective member 32, its one end is connected to the semiconductor amplifier 7 and, on its radially outer side, a heat dissipation fin (heat dissipation unit 8 that dissipates heat generated in the semiconductor amplifier 7 is formed, it is possible to provide a high output-power microwave excitation light-source device 1 that is compact and highly durable.

DESCRIPTION OF REFERENCE NUMERALS AND SIGNS

1: microwave excitation light-source device, 2: center conductor, 3: annular conductor, 31: light transmissive member, 32: reflective member, 4: arc tube, 4_s_: light emitting space, 4_w_: tube wall, 5: support unit, 6: coaxial line, 7: semiconductor amplifier, 8: heat dissipation unit, r2: radius (center conductor), r3: radius (annular conductor).

The invention claimed is:

1. A microwave excitation light-source device, comprising:

a center conductor extending in an axis direction; an annular conductor having light transparency and disposed concentrically with respect to the center conductor;

an arc tube in which a luminescent material is enclosed, said arc tube being disposed so as to extend along the axis direction in an annular space created between the center conductor and the annular conductor; and a support unit that supports the center conductor, the annular conductor and the arc tube and in which electrical connection paths for applying microwaves to the center conductor and the annular conductor are formed;

wherein the arc tube is configured so that, in a plane that is perpendicular to the axis direction, a single closed curve drawn along a tube wall of the arc tube intersects zero or even number of times, every line drawn from the center conductor toward the annular conductor.

2. The microwave excitation light-source device as set forth in claim 1, wherein a shape of the arc tube in cross-section perpendicular to the axis direction is a sector form that catches the center conductor at a center angle portion of that shape.

3. The microwave excitation light-source device as set forth in claim 2, wherein the arc tube is disposed in a region that is circumferentially one-sided with respect to the center conductor, and wherein one of following conditions is satisfied:

with respect to the center conductor, its part corresponding to a region where the arc tube is not disposed, is smaller in radius than its part corresponding to the region where the arc tube is disposed; and with respect to the annular conductor, its part corresponding to the region where the arc tube is not disposed, is larger in radius than its part corresponding to the region where the arc tube is disposed.

4. The microwave excitation light-source device as set forth in claim 2, wherein the arc tube is disposed in a region that is circumferentially one-sided with respect to the center conductor, and wherein a part of the annular conductor corresponding to a region where the arc tube is not disposed, is composed of a reflective member that reflects light.

5. The microwave excitation light-source device as set forth in claim 4, further comprising a semiconductor amplifier as a generation source of the microwaves, wherein, with respect to the reflective member, its one end is connected to the semiconductor amplifier and, on its radially outer side, a heat dissipation fin that dissipates heat generated in the semiconductor amplifier is formed.

6. The microwave excitation light-source device as set forth in claim 1, comprising arc tubes each being said arc tube, which are composed of multiple straight tubes that extend in the axis direction and are arranged in a circumferential direction.

7. The microwave excitation light-source device as set forth in claim 6, wherein the arc tube is disposed in a region that is circumferentially one-sided with respect to the center conductor, and wherein one of following conditions is satisfied:

with respect to the center conductor, its part corresponding to a region where the arc tube is not disposed, is smaller in radius than its part corresponding to the region where the arc tube is disposed; and with respect to the annular conductor, its part corresponding to the region where the arc tube is not disposed, is larger in radius than its part corresponding to the region where the arc tube is disposed.

8. The microwave excitation light-source device as set forth in claim 6, wherein the arc tube is disposed in a region that is circumferentially one-sided with respect to the center conductor, and wherein a part of the annular conductor corresponding to a region where the arc tube is not disposed, is composed of a reflective member that reflects light.

9. The microwave excitation light-source device as set forth in claim 8, further comprising a semiconductor amplifier as a generation source of the microwaves, wherein, with respect to the reflective member, its one end is connected to the semiconductor amplifier and, on its radially outer side, a heat dissipation fin that dissipates heat generated in the semiconductor amplifier is formed.

10. The microwave excitation light-source device as set forth in claim 1, wherein the center conductor and the annular conductor each have a rectangular shape as a shape perpendicular to the axis direction, to form a line structure.

11. The microwave excitation light-source device as set forth in claim 10, wherein the arc tube is disposed in a region that is circumferentially one-sided with respect to the center conductor, and wherein one of following conditions is satisfied:

with respect to the center conductor, its part corresponding to a region where the arc tube is not disposed, is smaller in radius than its part corresponding to the region where the arc tube is disposed; and with respect to the annular conductor, its part corresponding to the region where the arc tube is not disposed, is larger in radius than its part corresponding to the region where the arc tube is disposed.

12. The microwave excitation light-source device as set forth in claim 10, wherein the arc tube is disposed in a region that is circumferentially one-sided with respect to the center conductor, and wherein a part of the annular conductor corresponding to a region where the arc tube is not disposed, is composed of a reflective member that reflects light.

13. The microwave excitation light-source device as set forth in claim 12, further comprising a semiconductor amplifier as a generation source of the microwaves, wherein, with respect to the reflective member, its one end is connected to the semiconductor amplifier and, on its radially outer side, a heat dissipation fin that dissipates heat generated in the semiconductor amplifier is formed.

14. The microwave excitation light-source device as set forth in claim 1, wherein the arc tube is disposed in a region that is circumferentially one-sided with respect to the center conductor, and wherein one of following conditions is satisfied:

with respect to the center conductor, its part corresponding to a region where the arc tube is not disposed, is smaller in radius than its part corresponding to the region where the arc tube is disposed; and with respect to the annular conductor, its part corresponding to the region where the arc tube is not disposed, is larger in radius than its part corresponding to the region where the arc tube is disposed.

15. The microwave excitation light-source device as set forth in claim 14, wherein the arc tube is disposed in a region that is circumferentially one-sided with respect to the center conductor, and wherein a part of the annular conductor corresponding to a region where the arc tube is not disposed, is composed of a reflective member that reflects light.

16. The microwave excitation light-source device as set forth in claim 15, further comprising a semiconductor amplifier as a generation source of the microwaves, wherein, with respect to the reflective member, its one end is connected to the semiconductor amplifier and, on its radially outer side, a heat dissipation fin that dissipates heat generated in the semiconductor amplifier is formed.

17. The microwave excitation light-source device as set forth in claim 1, wherein the arc tube is formed into a spiral shape that extends along the axis direction while whirling in the annular space.

18. The microwave excitation light-source device as set forth in claim 1, wherein the arc tube is disposed in a region that is circumferentially one-sided with respect to the center conductor, and wherein a part of the annular conductor corresponding to a region where the arc tube is not disposed, is composed of a reflective member that reflects light.

19. The microwave excitation light-source device as set forth in claim 18, further comprising a semiconductor amplifier as a generation source of the microwaves, wherein, with respect to the reflective member, its one end is connected to the semiconductor amplifier and, on its radially outer side, a heat dissipation fin that dissipates heat generated in the semiconductor amplifier is formed.

* * * * *